(12) United States Patent
Guo et al.

(10) Patent No.: US 9,791,743 B2
(45) Date of Patent: Oct. 17, 2017

(54) STABILIZED PHOTO-ALIGNMENT LAYER FOR LIQUID CRYSTAL

(71) Applicant: Nano and Advanced Materials Institute Limited, Hong Kong (HK)

(72) Inventors: Qi Guo, Hong Kong (HK); Abhishek Kumar Srivastava, Hong Kong (HK); Vladimir Grigorievich Chigrinov, Hong Kong (HK); Hoi Sing Kwok, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 362 days.

(21) Appl. No.: 14/315,319

(22) Filed: Jun. 25, 2014

(65) Prior Publication Data

US 2015/0029453 A1 Jan. 29, 2015

Related U.S. Application Data

(60) Provisional application No. 61/958,358, filed on Jul. 26, 2013, provisional application No. 61/969,838, filed on Mar. 25, 2014.

(51) Int. Cl.
*G02F 1/1337* (2006.01)
*C09B 69/10* (2006.01)

(52) U.S. Cl.
CPC ...... *G02F 1/133711* (2013.01); *C09B 69/106* (2013.01); *G02F 1/133788* (2013.01)

(58) Field of Classification Search
CPC .................. G02F 1/133788; G02F 1/133711

(Continued)

(56) References Cited

U.S. PATENT DOCUMENTS

| 5,310,502 A | 5/1994 | Marshall |
| 5,753,139 A | 5/1998 | Wand |

(Continued)

FOREIGN PATENT DOCUMENTS

| EP | 1209515 A1 | 5/2002 |
| EP | 1710617 B1 | 10/2010 |

(Continued)

OTHER PUBLICATIONS

Computer-generated translation of JP 2003-270638 (Sep. 2003).*

(Continued)

*Primary Examiner* — John A McPherson
(74) *Attorney, Agent, or Firm* — Spruson & Ferguson (HK)

(57) ABSTRACT

A liquid-crystal photo-alignment layer that is composed of polymer stabilized azo dyes is provided, where a polymer network is introduced in the photo-alignment layer for stabilization. The photo-alignment layer is realized based on a two-step irradiation to first achieve molecule alignment to form the photo-alignment layer and then stabilize this layer. To realize the photo-alignment layer, a pre-determined surface of the substrate is first coated with a film of mixture. The mixture comprises an azo dye and a monomer preferably mixed in an optimal concentration of 0.67 wt/wt. The azo dye and the monomer have light-absorption peaks at different wavelengths such that photo-alignment of the azo-dye molecules and stabilization of the photo-alignment layer by polymerization of the monomer are achievable by two separate exposures of light to the film.

8 Claims, 9 Drawing Sheets

(58) Field of Classification Search
USPC .......... 430/321; 349/124; 427/508, 162, 164
See application file for complete search history.

(56) References Cited

U.S. PATENT DOCUMENTS

| | | | |
|---|---|---|---|
| 5,859,680 A | 1/1999 | Jungbauer et al. | |
| 6,919,404 B2 | 7/2005 | Gibbons et al. | |
| 2009/0269513 A1* | 10/2009 | Nishiyama | C09D 4/00 428/1.2 |

FOREIGN PATENT DOCUMENTS

| | | |
|---|---|---|
| JP | 2003270638 A | 9/2003 |
| WO | 9203483 A1 | 3/1992 |

OTHER PUBLICATIONS

Muravsky, A., et al., "Optical rewritable liquid-crystal-alignment technology" J. SID 15, 267-273 (2007).
Srivastava, K., et al., "Fast switchable grating based on orthogonal photo alignments of ferroelectric liquid crystals" Appl. Phys. Lett. 101, 031112 (2012).
Akiyama, H., et al., "Synthesis and properties of azo dye aligning layers for liquid crystal cells" Liq. Cryst. 29, 1321-1327 (2010).
Takada, H., et al., "Aligning Layers Using Azo Dye Derivatives for Liquid Crystal Devices" SID Int. Symp. Digest Tech. Papers 34, 620-623 (2003).
Yaroshchuk, Yaroshchuk, et al., "Stabilization of liquid crystal photoaligning layers by reactive mesogens" Appl. Phys. Lett. 95, 021902 (2009).
Yao, L.S., et al., "A novel composite alignment layer for transflective liquid crystal display" J. Phys. D:Appl. Phys. 43, 415505 (2010).
Guo, Q., et al., "Optimization of Alignment Quality by Controllable Anchoring Energy for Ferroelectric Liquid Crystal" Appl. Phys. Express 7,021701, (2014).
Sun, J., et al., "Optically Tunable and Re-Writable Diffraction Grating with Photo-Aligned Liquid Crystals" Opt. Letters 38, 2342-2344 (2013).
Ma, Y., et al., "Optically Rewritable Ferroelectric Liquid Crystal Grating" Eur. Phys. Lett. 102, 24005 (2013).
Barnik, M.I., et al., "Electrooptics of a thin ferroelectric smectic C* liquid crystal layer" Mol. Cryst. Liq. Cryst. 143, 101-112, (1987).
Beresnev, L.A., et al., "Deformed helix ferroelectric liquid crystal display: A new electrooptic mode in ferroelectric chiral smectic C liquid crystals" Liq. Cryst. 5, 1171-1177 (1989).
Shteyner, E.A., et al., "Submicron-scale liquid crystal photo-alignment" Soft Mat. 9, 5160 (2013).
Guo, Q., et al., "Voltage Sensor with wide Frequency Range using Deformed Helix Ferroelectric Liquid Crystal" Photon. Lett. Pol. 5, 2-4, (2013).
Pozhidaev, E., et al., "Photoalignment of Ferroelectric Liquid Crystals by Azodye Layers," Jpn. J. Appl. Phys., pp. 5440-5446 (2004).
Schadt, M., et al., "Surface-Induced Parallel Alignment of Liquid Crystals by Linearly Polymerized Photopolymers," Jpn. J. Appl. Phys., pp. 2155-2164 (1992).
Bawa, S.S., et al., "Novel alignment technique for surface stabilized ferroelectric liquid crystal," Appl. Phys. Lett., 57, 1398 (1990).
European Search Report of EP14177552.8 dated of Oct. 23, 2014.
Chigrinov, V. G. et al., Liquid crystal photoalignment: history and future, SPIE 6487, Emerging Liquid Crystal Technologies II, 64870F (2007).
Office Action of Korean Patent Application No. 10-2014-0091854 issued from the the Korean Intellectual Property Office on Jan. 26, 2017.
Qi Guo, et.al., Novel Composite Photo-alignment Layer for Ferroelectric Liquid Crystal Display, SID Digest 2013, 1353-1354.

* cited by examiner

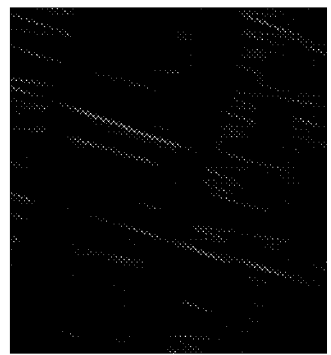
Dark
Dark
(a)
(b)
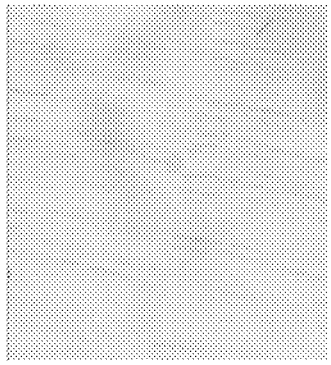
Bright
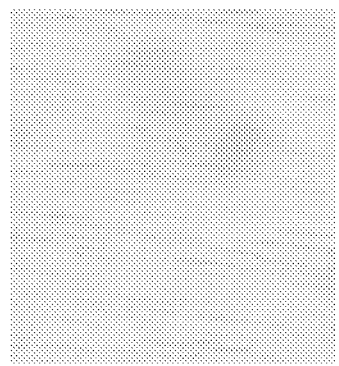
Bright
FIG. 7

STABILIZED PHOTO-ALIGNMENT LAYER FOR LIQUID CRYSTAL

CROSS-REFERENCE TO RELATED APPLICATION

This application claims the benefit of U.S. Provisional Application No. 61/958,358, filed Jul. 26, 2013, and the benefit of U.S. Provisional Application No. 61/969,838, filed Mar. 25, 2014. The disclosure of each of the aforementioned US provisional applications is incorporated by reference herein in its entirety.

FIELD OF THE INVENTION

The present invention generally relates to a liquid-crystal (LC) photo-alignment layer formed on a substrate. In particular, the present invention relates to forming the photo-alignment layer from a film of mixture comprising an azo dye and a monomer, whereby photo-alignment and layer stabilization are achievable by two separate exposures of light to the film.

BACKGROUND

There follows a list of references that are occasionally cited in the specification. Each of the disclosures of these references is incorporated by reference herein in its entirety.

LIST OF REFERENCES

[1] V. G. Chigrinov, *Liquid Crystal Devices: Physics and Applications* (Artech-House, Boston-London, 1999), 357 pp.

[2] M. J. O'Callaghan, R. Ferguson, R. Vohra, W. Thurmes, A. W. Harant, C. S. Pecinovsky, Y. Zhang, S. Yang, M. O'Neill, M. A. Handshy, "Bistable FLCOS devices for doubled-brightness miro-projectors" J. SID 17, 369-375 (2009).

[3] F. Fan, T. Du, A. K. Srivastava, L. Wang, V. G. Chigrinov, H. S. Kwok, "Axially symmetric polarization converter made of patterned liquid crystal quarter wave plate" Opt. Express 20, 23036-23043 (2012).

[4] E. P. Pozhidaev, V. G. Chigrinov, X. H. Li, "Photoaligned Ferroelectric Liquid Crystal Passive Matrix Display with Memorized Gray Scale" Jpn. J. Appl. Phys. 45, 875-882 (2006).

[5] S. Y, Huang, H. Y. Zheng, K. Y. Yu, B. Y. Huang, H. R. Lin, C. R. Lee, C. T. Kuo, "Electrically tunable prism grating based on a liquid crystal film with a photoconductive layer" Opt. Mater. Express 2, 1791-1796 (2012).

[6] R. Kurihara, H. Furue, T. Takahashi, T. Yamashita, J. Xu, S. Kobayashi, "Fabrication of Defect-Free Ferroelectric Liquid Crystal Displays Using Photoalignment and Their Electrooptic Performance" Jpn. J. Appl. Phys. 40, 4622-4626 (2001).

[7] X. Zhao, A. Bermak, F. Boussaid, T. Du, V. G. Chigrinov, "High-resolution photoaligned liquid-crystal micropolarizer array for polarization imaging in visible spectrum" Opt. Letters 34, 3619-3621 (2009)

[8] A. Muraysky, A. Murauski, X. Li, V. G. Chigrinov, H. S. Kwok, "Optical rewritable liquid-crystal-alignment technology" J. SID 15, 267-273 (2007).

[9] A. K. Srivastava, W. Hu, V G. Chigrinov, A. D. Kiselev, Y. Q. Lu, "Fast switchable grating based on orthogonal photo alignments of ferroelectric liquid crystals" Appl. Phys. Lett. 101, 031112 (2012).

[10] H. Akiyama, T. Kawara, H. Takada, H. Takatsu, V. G. Chigrinov, E. Prudnikova, V. Kozenkov, H. S. Kwok, "Synthesis and properties of azo dye aligning layers for liquid crystal cells" Liq. Cryst. 29, 1321-1327 (2010).

[11] H. Takada, H. Akiyama, H. Takatsu, V. G. Chigrinov, E. Prudnikova, V. Kozenkov, H. S. Kwok, "Aligning Layers Using Azo Dye Derivatives for Liquid Crystal Devices" SID Int. Symp. Digest Tech. Papers 34, 620-623 (2003).

[12] O. Yaroshchuk, V. Kyrychenko, Du Tao, V. G. Chigrinov, H. S. Kwok, H. Hasebe, H. Takatsu, "Stabilization of liquid crystal photoaligning layers by reactive mesogens" Appl. Phys. Lett. 95, 021902 (2009).

[13] L. S. Yao, T. Du, V. G. Chigrinov, H. S. Kwok, L. Xuan, "A novel composite alignment layer for transflective liquid crystal display" J. Phys. D: Appl. Phys. 43, 415505 (2010).

[14] Q. Guo, A. K. Srivastava, E. P. Pozhidaev, V. G. Chigrinov, H. S. Kwok, "Optimization of Alignment Quality by Controllable Anchoring Energy for Ferroelectric Liquid Crystal" Appl. Phys. Express 7,021701, (2014).

[15] J. Sun, A. K. Srivastava, L. Wang, V. G. Chigrinov, H. S. Kwok, "Optically Tunable and Re-Writable Diffraction Grating with Photo-Aligned Liquid Crystals" Opt. Letters 38, 2342-2344 (2013).

[16] Y. Ma, J. Sun, A. K. Srivastava, Q. Guo, V. G. Chigrinov, H. S. Kwok, "Optically Rewritable Ferroelectric Liquid Crystal Grating" Eur. Phys. Lett. 102, 24005 (2013).

[17] V. G. Chigrinov, V. M. Kozenkov, H. S. Kwok, *"Photoalignment of Liquid Crystalline Materials: Physics and Applications"*, (Wiley, 2008), 248 pp.

[18] M. I. Barnik, V. A. Baikalov, V. G. Chigrinov, E. P. Pozhidaev, "Electrooptics of a thin ferroelectric smectic C* liquid crystal layer" Mol. Cryst. Liq. Cryst. 143, 101-112, (1987).

[19] L. A. Beresnev, V. G. Chigrinov, D. I. Dergachev, E. P. Pozhidaev, J. Funfschilling, M. Schadt, "Deformed helix ferroelectric liquid crystal display: A new electrooptic mode in ferroelectric chiral smectic C liquid crystals" Liq. Cryst. 5, 1171-1177 (1989).

[20] E. A. Shteyner, A. K. Srivastava, V. G. Chigrinov, H. S Kwok, A. D. Afanasyev, "Submicron-scale liquid crystal photo-alignment" Soft Mat. 9, 5160 (2013).

[21] Q. Guo, Z. Brodzeli, L. Silvestri, A. K. Srivastava, E. P. Pozhidaev, V. G. Chigrinov, H. S. Kwok, "Voltage Sensor with wide Frequency Range using Deformed Helix Ferroelectric Liquid Crystal" Photon. Lett. Pol. 5, 2-4, (2013).

[22] E. Pozhidaev, V. Chigrinov, D. Huang, A. Zhukov, J. Ho and H. S. Kwok, "Photoalignment of Ferroelectric Liquid Crystals by Azodye Layers," Jpn. J. Appl. Phys., pp 5440-5446 (2004).

[23] M. Schadt, K. Schmitt, V. Kozinkov and V. Chigrinov, "Surface-Induced Parallel Alignment of Liquid Crystals by Linearly Polymerized Photopolymers," Jpn. J. Appl. Phys., pp 2155-2164 (1992).

[24] S. S. Bawa, A. M. Biradar, K. Saxena, and S. Chandra, "Novel alignment technique for surface stabilized ferroelectric liquid crystal," Appl. Phys. Lett., 57, 1398 (1990).

There follows a list of patents and patent applications occasionally cited in the specification.

LIST OF PATENTS AND PATENT APPLICATIONS CITED

[25] W. M. Gibbons et al., "Hybrid polymer materials for liquid crystal alignment layers" U.S. Pat. No. 6,919,404 (2005).

[26] N. Sawatari, M. Okabe, and H. Hama "Liquid crystal display device," EP Patent No. 1,710,617 (2006).
[27] K. L. Marshall, "High tilt angle FLC mixture for TIR switching devices," U.S. Pat. No. 5,310,502 (1994).
[28] D. Jungbauer et al., "Electrical addressing of ferroelectric liquid-crystal displays" U.S. Pat. No. 5,859,680 (1999).
[29] M. D. Wand and R. T. Vohra, "High contrast distorted helix effect electro-optic devices and tight ferroelectric pitch ferroelectric pitch ferroelectric liquid crystal compositions useful therein," U.S. Pat. No. 5,753,139 (1998).

The most important applications of LC display (LCD) cell with fast response, high resolution and contrast may also include fast response photonics devices, such as modulators, filters, attenuators and high resolution requirement displays such as pico-projector, 3D display, micro-display, HDTV etc. For such applications, the LC alignment becomes critically important. The conventional alignment technique, i.e. rubbing, offers several mechanical damages and is not good for the yield of the high resolution displays. Nowadays, photo-alignment remains among the most promising candidates to replace rubbing procedure in LC devices. Avoiding mechanical contact with the aligning layer, the photo-alignment technique minimizes mechanical damage and electric charging, which is especially critical in ferroelectric liquid crystal (FLC) devices. Also, it is highly demanded in a number of new developments when LC alignment used on curved surfaces, or on the surfaces of microscopic scale. For FLC devices, azo-dye materials bear advantages, like sufficiently high polar and azimuthal anchoring energy, voltage holding ratio (VHR) and appropriate pretilt angles, to achieve uniform alignment. It has been reported that photo-aligning azo-dyes, which can be easily rotated with blue light, could provide anchoring energy as strong as a commercial polyimide film and show potential for applications as optical rewritable liquid crystal devices and alignment layers for FLC devices. The rewritable property could show tunable control of alignment for LC and further change the displayed information of the LCD easily. Therefore, the photo-alignment becomes critically important and for the purpose azo-dyes are most suitable aligning layers particularly for the FLCs. However, the photo-degradation is the real challenge to deploy these systems for the real applications. Thus, the stabilized photo-alignment layer is needed. In the art, there has been research for providing such stable alignment layers, but other issues like residual DC charge, VHR and anchoring energy do not meet the criterion for acceptance.

A review of prior art regarding providing stable alignment layers is given as follows.

Photo-alignment, particularly for the FLCs, has got huge attention for a variety of applications in photonic and display devices. Exclusion of mechanical contact with the aligning layer, the photo-alignment technique minimizes mechanical damage and unwanted electric charging [1-3], which is a serious issue for FLC devices [4]. Moreover, it is highly demanded for numerous developments when LC alignment is used on curved surfaces, or on surfaces of microscopic scale [5-7]. It has been reported that photo-aligning azo dyes, the easy axes of which can be altered by further exposure of blue light, could provide anchoring energy comparable to commercial polyimide films and have a potential for a variety of applications, e.g., optical rewritable LC devices and alignment layers for FLC devices [8].

LC photo-alignment based on reorientation process of azo dyes provides precise control on the anchoring energy of the alignment layer by varying irradiation energy. This approach has been proven to be an excellent tool to achieve a good optical quality for electrically suppressed helix FLCs (ESH-FLC) [9]. However, these photo-alignment layers based on the reorientation process are not stable and can be destroyed by further exposure of light or thermal energy. Furthermore, such azo dyes are highly sensitive to visible light, particularly the blue light, making the problem even more serious for display applications where such alignment layers are exposed to strong backlight all the time. Considering these challenges, the alignment stability of azo dyes is required to be enhanced for the photo and the thermal exposure in applying such photo-alignment technique in modern display devices [10].

Several research efforts have been made regarding stabilizing the azo-dye photo alignment. As early as 2003, it was proposed to add a reactive group, capable to be polymerized, to the dye molecule itself, but it results in poor anchoring energy. Moreover, a dual photo-reactive group in one copolymer structure was also explored by introducing a photo-crosslinking group [11]. However, these ideas led to long time and high cost of synthesis. Furthermore, the alignment quality of LCs was ruined because of additional groups. Recently, a liquid crystal polymer (LCP) layer has been used to deposit on top of the azo dye film. In spite of having a strong constraint on the layer thickness of LCP, it hardly can provide sufficient stabilization to the azo-dye photo alignment layer [12]. In another approach, a crosslinking material has been added to the azo-dye material [13]. This approach provides good stability to the alignment layer but due to a complex molecular structure, the resultant optical quality is not good, particularly for the FLC.

There is a need in the art for a photo-alignment layer having good alignment quality and stability as well as good performance in terms of residual DC charge, voltage holding ratio and anchoring energy.

In the present invention, a composite layer based on mixing of a LC monomer with an azo-dye material is disclosed as an alignment layer for LCDs. With the optimal concentration of the monomer in SD1 solution, a dual functional alignment film with a two-step exposure process is obtained. The fine alignment quality derived from azo-dyes is retained and a good photo-stability is achievable by stabilizing the liquid crystal polymer network.

The present invention is different from the prior art in the following aspects.

In [25], it has disclosed hybrid polymer optical alignment layers for inducing alignment of a liquid crystal medium. Hybrid polymers are prepared form at least one component selected form the group consisting of monomer, macro monomer and polymer within the class of polyimides, poly (amic acids) and esters thereof and at least one component selected form the group consisting of addition monomer and functionalized addition polymer wherein the two components are covalently bonded to form a copolymer. The disclosure of [25] further describes LCDs comprising the novel branched hybrid polymer optical alignment layers.

In [26], it has disclosed a LCD using a FLC, which can give mono-domain alignment of the FLC without forming alignment defects such as zigzag defects, hairpin defects and double domains and which is so remarkably good in alignment stability that the alignment thereof can be maintained even if the temperature of the liquid crystal is raised to the phase transition point or higher. The disclosure of [26] achieves the object by providing a LCD comprising a FLC sandwiched between two substrates, wherein an electrode and a photo alignment layer are each successively formed on opposite faces of the two substrates facing each other, a constituent material of the respective photo alignment layer is a photoreactive material which generates a photoreaction to give anisotropy to the photo alignment layer; and the constituent material of the respective photo alignment layer has different composition from each other with the FLC sandwiched therebetween.

In [27], it has disclosed a series of ferroelectric smectic liquid crystal compounds of wide tilt angle and mixtures formulated from them that are useful for high speed modulation or switching of optical radiation. Such FLC mixtures are useful in total internal reflection, TIR switching devices. In such TIR switches, an applied DC voltage rotates the molecules through about a 90° angle which changes the perceived refractive index at the FLC layer and permits rapid optical switching. For an FLC crystal material to be useful in such a device it must possess a value of molecular tilt angle θ of approximately 45°, since the dipole molecule rotates through an angle of about 2θ upon application of a DC field to the cell. This requirement for a large molecular tilt angle greatly limits the compounds and mixtures thereof which can be employed in such TIR devices.

In [28], it has disclosed a process for the stabilization of the spatial alignment of the smectic layers in an FLC switching and/or display element, in which the original position of the smectic layers has been modified by electrical filed treatment, which comprises alternately switching the elements during non-operation and/or when a certain temperature is exceeded which is above a predetermined temperature range which includes the operating temperature which is below a predetermined temperature range which includes the operating temperature region.

In [29], it has disclosed FLCs which exhibit a ferroelectric phase and a chiral nematic phase at temperatures above the ferroelectric phase are provided. The natural helix pitch of the FLC in the ferroelectric phase of these materials is sufficiently tighter than them thickness of the FLC layer such that it is not surface-stabilized. The chiral nematic phase has a natural helix pitch sufficiently greater than the cell thickness to facilitate alignment of the FLC in and FLC device to achieve high contrast.

There are also other prior art in the technical field of LCDs and photo-alignment layers, such as [22]-[24].

In the disclosure of the present invention, the use of a two-step exposure process is new and novel, and has not been taught and suggested in the prior art.

SUMMARY OF THE INVENTION

A first aspect of the present invention is to a LC photo-alignment layer comprising a polymer-stabilized azo dye. In particular, the photo-alignment layer is formed by coating a substrate uniformly with an azo dye and a monomer and exposing to light for providing photo-alignment and stabilization such that good and stable photo-alignment for liquid crystals is achieved, wherein the photo-alignment and the stabilization have been established by two separate exposures of light. The absorption peak of the azo dye and an absorption peak of the monomer are different.

Preferably, the polymer-stabilized azo dye alignment layer has been realized by mixing the azo dye and the monomer in an optimal concentration and then dissolving in a solvent. It is also preferable that polymerization of the monomer has been done after defining a preferred orientation of an easy axis of the azo dye, by photo-cross-linking, or by thermal imidization.

In addition, a polar anchoring energy or an azimuthal anchoring energy is tunable by irradiance doses such that the anchoring energy is obtainable from a minimum value to a sufficiently high value.

Furthermore, full polymerization of the monomer provides minimum and acceptable values of residual DC voltage, and/or provides maximum and acceptable values of voltage holding ratio. The photo-alignment layer after full polymerization of the monomer provides electro-optical parameters substantially similar to those of an intrinsic azo dye layer.

A second aspect of the present invention is to provide a method for forming a liquid-crystal photo-alignment layer on a substrate.

The method comprises coating a pre-determined surface of the substrate with a film of mixture. The mixture comprises an azo dye and a monomer. The azo dye has a light-absorption peak at a first wavelength and is configured such that orientation of molecules of the azo dye is rearranged according to a polarization orientation of polarized light irradiated on and absorbed by the film. The monomer has a light-absorption peak at a second wavelength and is polymerizable by absorbing light irradiated on the film. The first wavelength is spaced apart from the second wavelength such that photo-alignment of the azo-dye molecules and stabilization of the photo-alignment layer are achievable by two separate exposures of light to the film.

Preferably, the method further comprises irradiating the film with a first light beam that is polarized and has a first spectrum including the first wavelength and excluding the second wavelength, whereby photo-alignment of the azo-dye molecules is achieved, causing at least part of the film to form the photo-alignment layer on the substrate. The method additionally comprises after the film is irradiated with the first light beam, irradiating the photo-alignment layer with a second light beam that is polarized and has a second spectrum including the second wavelength, whereby the monomer is polymerized to stabilize the photo-alignment layer that is formed.

Other aspects of the present invention are disclosed as illustrated by the embodiments hereinafter.

BRIEF DESCRIPTION OF THE DRAWINGS

FIG. 5 show schematic diagrams of SD1 stabilization using composite layer with photosensitive polymer, where

FIG. 7 depicts bright and dark states of the FLC cell: (a) with a pure SD1 alignment layer; and (b) with the stabilized alignment layer.

DETAILED DESCRIPTION

The present invention is developed based on the following observation. Recently, it has been observed that good control on the anchoring energy provides an opportunity to optimize optical characteristics of displays, particularly the ESHF-FLC's [14-16]. Moreover, the anchoring energy of an azo-dye alignment layer is tunable by different irradiation doses [14, 15]. Therefore, to achieve a good optical quality, it is critically important to perform both processes, i.e. alignment and stabilization, separately. In simple words, it is preferred to have distinct absorption bands for the photo-alignment azo dye and the stabilizing material. Here, the stabilizing material is a monomer that forms a polymer in the stabilization process.

The proposition of using two separate processes for alignment and stabilization to achieve a good optical quality has been verified by an experiment detailed in Section A below. Section B provides the experimental results. With the optimal concentration of a monomer and an azo dye in a mixture followed be a two-step irradiation, first for the alignment and second for the stabilization of the photo-alignment layer, it has been found to yield a stabilized photo-alignment layer that provides good alignment quality with anchoring energy comparable to that of a pure azo-dye layer. The stability of such prepared composite alignment layer has also been confirmed by testing for photo, UV and thermal stabilities. Furthermore, the display-related parameters for the alignment layer, i.e. a residual DC (RDC) and a VHR, were measured and found to be in acceptable ranges. Therefore, such composite photo-alignment layer has immense potential for applications in various modern displays and photonic devices.

The present invention is detailed in Section C.

A. EXPERIMENT

Figure 1:
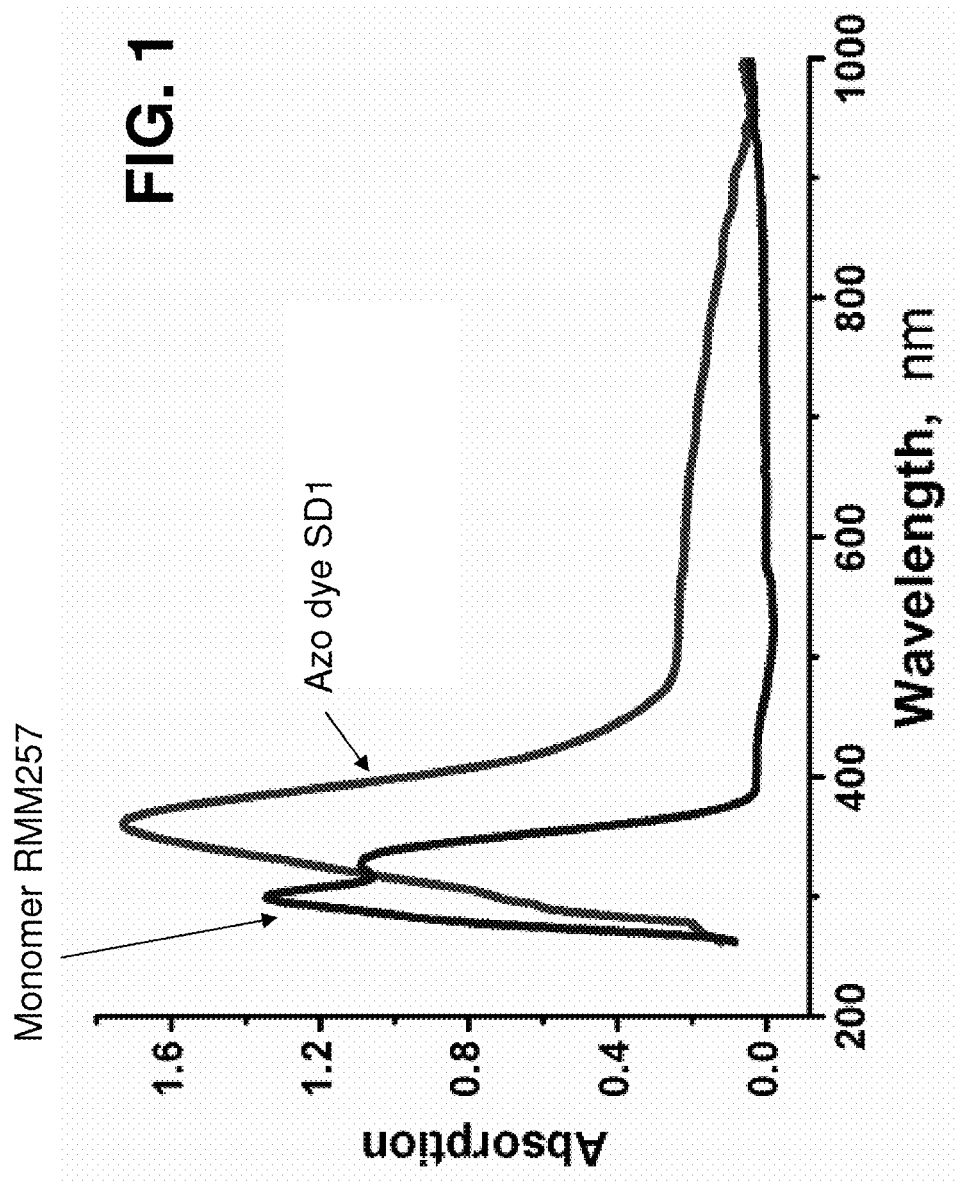
FIG. 1 shows the absorption spectrums of the photosensitive material SD1 (an azo dye) and of the monomer RMM257, indicating that the two spectrums have different absorption peaks.

The azo-dye material SD1 (from Dainippon Ink and Chemicals ltd) with absorption peaks at 365 nm and 450 nm (as shown in FIG. 1) has been used as the photo-alignment layer [10]. The monomer RMM257 (from Merck) with an absorption peak at 300 nm (the absorption spectrum shown in FIG. 1) has been chosen as the stabilizer. Furthermore, the concentration optimization of the monomer in a solution is needed to minimize the screening of aligning characteristic of the pure SD1 and other addressing parameters. Therefore, to avoid such screening, the mixture preparation was done as follows. First, the solution of the photo-alignment material SD1 with concentration 1% wt/wt (i.e. the optimized concentration for the FLCs) in dimethylformamide (DMF) is prepared and termed as Sol-A [10, 14]. Thereafter another solution was prepared by dissolving a monomer RMM257 and a photo-initiator Igracure 651 (1% wt/wt of RMM257) in the same solvent DMF with the concentration 1% wt/wt. The resultant solution was termed as Sol-B. Afterwards, five mixtures were prepared by mixing both solutions in the volumetric ratios of 1:9, 3:7, 4:6, 5:5 and 7:3 for Sol-A and Sol-B respectively. The proper miscibility of the two solutions was insured by stirring (by means of a magnetic stirrer) the mixture for 24 hours.

Thereafter, the composite alignment film was prepared by coating the final solutions on a glass substrate followed by a two-step irradiation process. The first irradiation was done with high power (90 mW/cm$^2$) polarized LED light (450 nm), with using an optical filter to avoid light of 320 nm, for a 10 min exposure to thereby provide a preferred easy axis to SD1 molecules with an optimal anchoring energy that could be different for different FLC materials [14]. Just after the first irradiance, for alignment, the same substrate was exposed in a second time by a polarized UV lamp ($\lambda$=320 nm and intensity of 3 mW/cm$^2$) with an optical filter to avoid light of 365-450 nm, where the plane of polarization was substantially close to that in the first exposure. The second exposure was used to create a polymer network to stabilize the SD1 photo-alignment layer. It was observed that a 2-minute irradiation by a polarized UV light was enough to provide good stability to a SD1 layer with an acceptable aligning characteristic of the SD1. Thereafter, the cell was assembled by these substrates with several cell thicknesses (d) for different tests. The d=1.5 µm was used to study the optical stability of the FLC layer whereas d=5 µm was used to study the electro-optical characteristic, viz., voltage holding ratio (VHR), transmittance versus voltage response curve (TVC), anchoring energy etc. for the composite alignment layer.

To test the stability of the photo-alignment layer, the alignment quality of the sample was compared before and after the exposure in terms of the photo, UV and thermal energy. First, the cell was fabricated with the alignment layer described above. Thereafter the cell was heated up to the isotropic temperature (i.e. 100° C.) and was exposed to the polarized visible/UV light with a polarization azimuth of the impinging light parallel to the easy axis of the fabricated cell. This irradiation pushes the easy axis of the alignment layer in orthogonal direction. Therefore, if the alignment layer is not stable, the easy axis rotates and causes distortion and local defect in the alignment, thus decreasing the contrast ratio of the FLC cell. However, if the alignment layer is stable, the contrast ratio hardly has a significant impact due to such exposures.

In addition to the photo stability, the thermal stability and the optical contrast, the anchoring energy and the VHR are equally-important parameters for a LC alignment layer. The aforementioned properties of a cell were studied by placing the cell between two crossed polarizers while the whole set was illuminated by He—Ne laser (632 nm). Thereafter, electrically modulated optical signals were recorded by a photo-detector.

The thermal stability of the photo-alignment layer has been confirmed by comparing the TVC (transmittance against applied voltage curve) curve of nematic LC cells (d=5 µm), made of a pure azo-dye alignment layer and a polymer-stabilized azo-dye alignment layer, after heating them at different temperatures till 230° C. [17]. To measure the VHR in the same experiment, first a pulse of 5V was applied to the cell for 60 µs and thereafter the transmittance was recorded against time [18, 19]. The same experiment arrangement was also used for the contrast-ratio and the anchoring-energy measurements. Detailed measurement procedure was given in [14, 18-19].

The fabricated polymer and azo-dye composite photo-alignment layer provides an opportunity to tune the anchoring energy that is of great interest particularly for the ESHFLC materials. Therefore, most of the tests, viz., the contrast ratio, the anchoring energy, the photo stability, were tested on ESHFLC cell with d=1.5 µm thick cell and FLC-595. The FLC 595 is characterized by a spontaneous polarization of $P_S$=40 nC/cm$^2$, a tilt angle of 21.3°, a rotational viscosity of 0.022 Pa·s, elastic constant of $K_{22}$=1.65×10$^{-11}$ N, and a helix pitch of $P_0$=0.72 µm at a temperature T=22° C. The phase transition sequence of FLC-595 can be given by Cr→SmC*→SmA→Iso at 22° C., 38° C., and 72° C. respectively. On the other hand, tests related to the thermal stability, the VHR and the RDC measurement were done on a 5 µm-thick cell nematic LC with the same photo-alignment layer. The Nematic LC MDA-01-4697 (from DIC) was used for these tests. The phase sequence of this material is given by Cr→N→Iso at −20° C. and 100° C. respectively.

B. EXPERIMENTAL RESULTS

Figure 2:
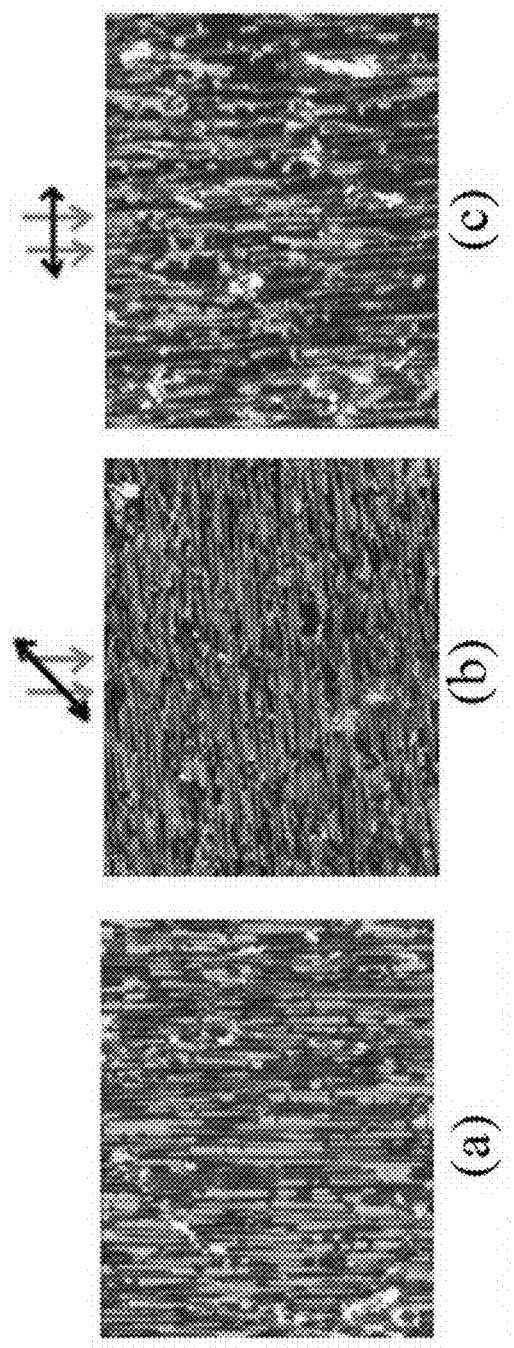
FIG. 2 shows the microscopic pictures of FLC textures of pure SD1 layer, in which the inset (a) is the one without re-exposure, the inset (b) is the one with re-exposure once, and the inset (c) is the one with re-exposure twice.

The phenomenon of the re-writeability of the easy axis of SD1 alignment layer has been elaborated by the optical textures (taken by an Olympus microscope under crossed polarizers) of 1.5 µm thick FLC cell, in FIG. 2. FIG. 2(a) shows the optical texture of the initial FLC cell with optimal anchoring energy for the pure SD1 alignment layer [14]. The two-domain structure reveals the best optical quality with the maximum contrast ratio [9, 16]. The cell has been heated up to slightly above the isotropic temperature of the FLC material and thereafter it has been exposed to the polarized blue light with polarization azimuth parallel to the easy axis of the initial alignment. This irradiation attempts to manipulate the easy axis in the direction orthogonal to the initial direction. Afterwards, the cell has been cooled to the room temperature and the optical texture has been shown in FIG. 2(b). It is clear from the figure that the easy axis in FIG. 2(b) is orthogonal to the initial easy axis (in FIG. 2(a)). The whole process has been repeated with the orthogonal polarization azimuth of the exposing light to the previous step. The easy axis of the SD1 alignment layer was manipulated again with relatively worse alignment and thus the worse optical quality. Thus one can conclude here that the alignment by pure SD1 is not stable and can be altered by the further irradiation.

The same test has also been done on the polymer and azo-dye composite alignment layer to test the stability. The photo-stability of the polymer and azo-dye composite layer has been evaluated by the exposure energy needed to rearrange the orientation of SD1 molecules for pure and composite mixture and therefore the stability factor α is defined as $$\alpha = \frac{E_{composite\ layer}}{E_{pure\ SD1}} \quad (1)$$

where $E_{composite\ layer}$ is the exposure energy needed to rewrite RMM257/SD1 composite layer, and $E_{pure\ SD1}$ is the exposure energy needed to rewrite pure SD1 layer. The stability parameter has been plotted against the different mixture concentrations and respective optical texture of FLC-595 with d=1.5 µm. It has been found that the 4/6 mixture (i.e. 40% Sol-B and 60% Sol-A) shows the least screening of the alignment characteristics of the pure SD1 and offers a good stability with α∼20. The stability parameter for mixtures 5/5 and 7/3 are comparatively higher than the mixture 4/6 but at the same time severe screening of the aligning characteristic of the SD1 has been observed for the higher concentration of the Sol-B. Therefore, mixtures with higher concentrations of the Sol-B have been left out of the scope of present work.

Since the mixture 4/6 shows a good stability with an acceptable alignment and thus a better optical quality with α=20, further tests and improvements have been done on the mixture 4/6 mixture only. Furthermore, the RMM257/SD1 composite alignment layer has also been tested for photo-stability issue in an industrial environment. The UV-stability and photo-stability of the stabilized SD1 layer, because of its photo sensitivity, are critically important for the fabrication issues. Therefore, different exposure sources, i.e. a blue LED with a polarized light intensity of 40 mW/cm$^2$, a blue laser with a polarized light intensity of 1 W/cm$^2$ and a white lamp with a whole visible spectrum and non-polarized light of intensity 50 W/cm$^2$, have been used to test the UV-stability and photo-stability of the proposed alignment layer.

TABLE 1

UV-stability and photo-stability of composite 4/6 SD1 layer tested with FLC cells.

|  | Initial Alignment | Blue LED 60 mins | Blue Laser 10 sec | Lamp 30 hr | Lamp 3 days |
|---|---|---|---|---|---|
| CR at 10 V | 1550 | 1346 | 1142 | 1465 | 1436 |
| CR at 5 V | 1423 | 1236 | 1049 | 1345 | 1321 |
| $W_Q$ (J/m$^2$) | 5.42 × 10$^{-4}$ | 4.70 × 10$^{-4}$ | 3.99 × 10$^{-4}$ | 5.12 × 10$^{-4}$ | 5.02 × 10$^{-4}$ |

The contrast ratio (at two different operating voltages, i.e. 5V and 10V) and the anchoring energy of the stabilized SD1 for a photo aligned FLC cell have been measured before and after exposure treatment and thereafter compared, as shown in TABLE 1. The contrast ratio and the anchoring energy coefficient $W_Q$ for the RMM257/SD1 composite alignment layer are almost the same before and after the photo treatments and deviations in values are within the experimental errors limits. Thus, from TABLE 1, it can be advised that the alignment quality of the RMM257/SD1 composite alignment layer after re-exposure maintains the same level and shows good photo and UV stability.

Figure 3:
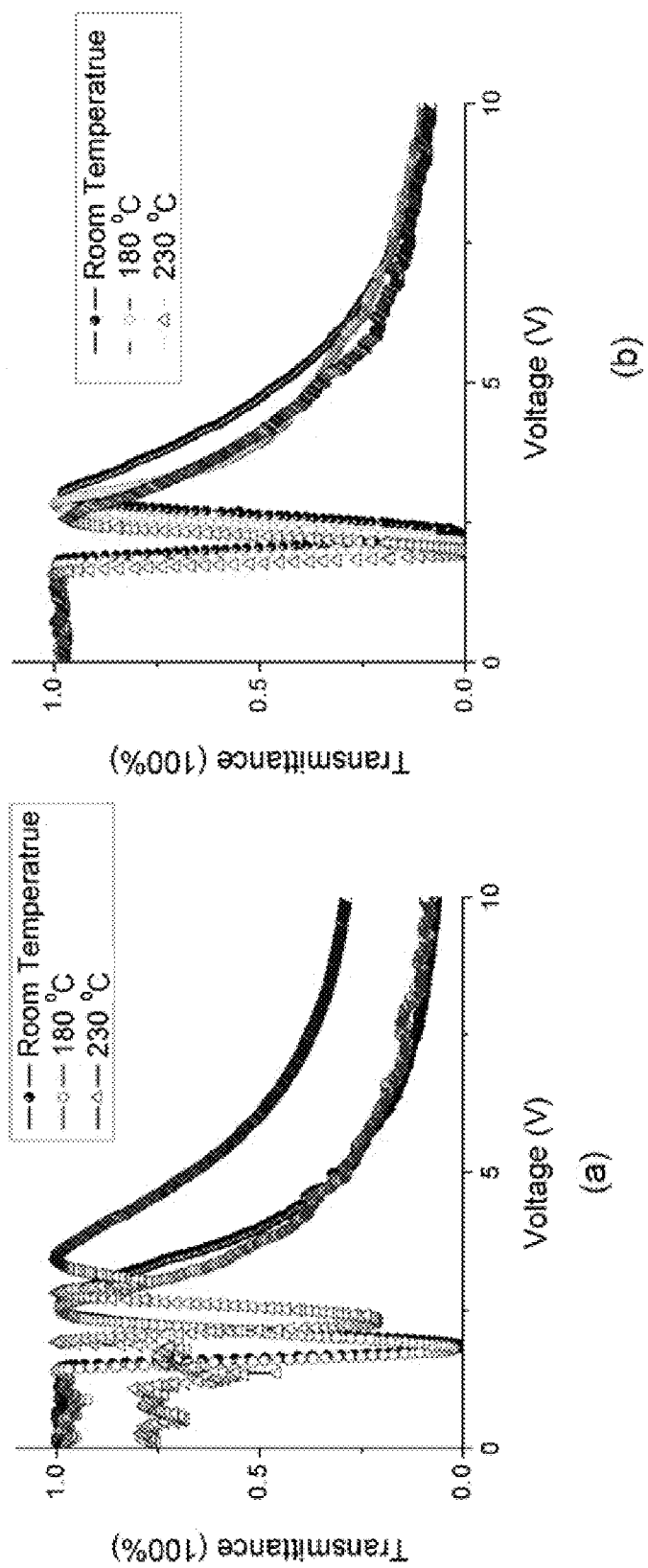
FIG. 3 shows the TVC curves of a photo aligned nematic LC cell at room temperature before and after thermal treatment of the cell, where the inset (a) is the cell using a photo-alignment layer based on pure SD1, and the inset (b) is the cell using a photo-alignment layer based on stabilized SD1.

In addition to the photo-stability, temperature stability is also an important issue that is a big concern for manufacturers due to several high temperature fabrication processes in the manufacturing line. To test the thermal stability of the fabricated polymer azo-dye composite photo-alignment layer, nematic LC cells with 5 µm thickness have been prepared with pure and composite SD1 alignment layer, and afterwards the TVC curve, at room temperature, has been recorded before and after the thermal exposure. FIG. 3 shows the TVC curve for the pure and the RMM257/SD1 composite photo aligned nematic LC cells before and after thermal treatment at 180° C. and 230° C. for 2 hrs. For the pure SD1 alignment layer, the TVC curve after the thermal exposure at 180° C. for 2 hours repeats itself, clearly suggesting that the alignment layer is not affected after this thermal exposure. Whereas after the thermal exposure at 230° C., the TVC curve is all deteriorated, indicating that the thermal exposure at 230° C. destroys the SD1 alignment layer. On the other hand, the TVC plot, before and after the thermal exposure, for the RMM257/SD1 composite layer is almost the same, and the LC material degradation at high temperature can be attributed for the small deviation in the characteristics. However, the nature of the plot is the same, thus confirming that the RMM257/SD1 composite layer shows good thermal stability.

Figure 4:
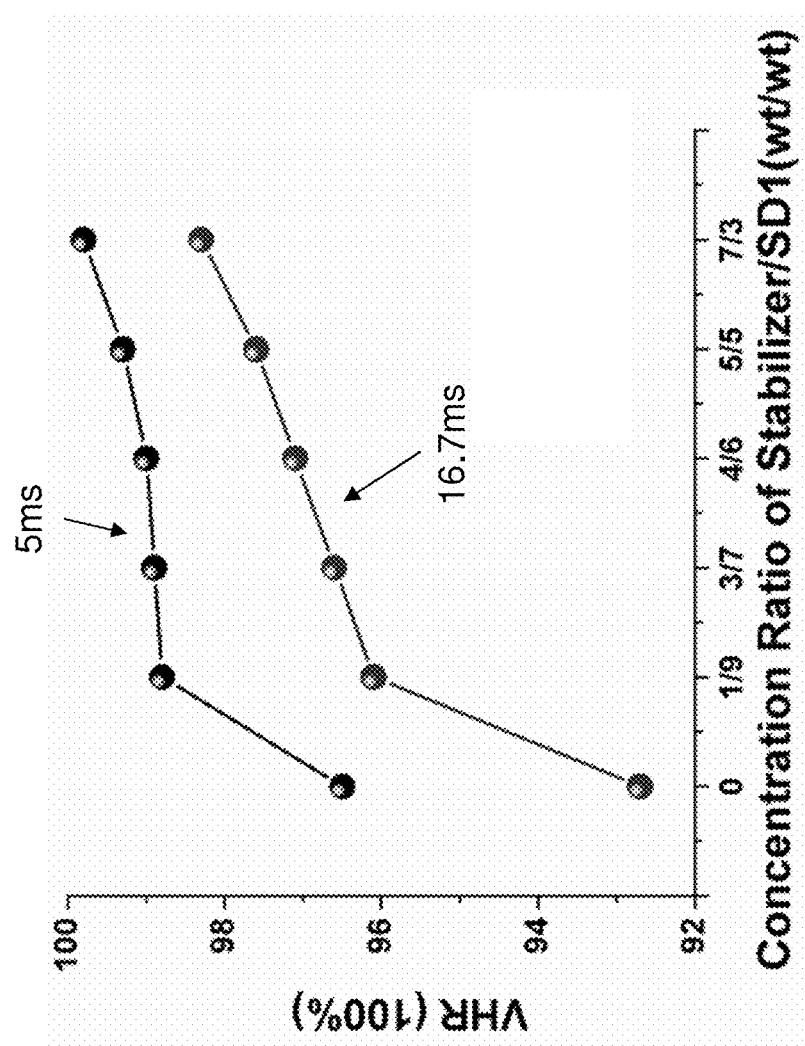
FIG. 4 shows the concentration dependence of the VHR for the RMM257/SD1 composite photo alignment layer with different frame time.

The VHR is another important issue for active matrix LCDs. We have measured the VHR for the similar 5 μm-thick nematic cell. According to a widely accepted definition, the VHR is used to evaluate at the display frame time 16.7 ms. For this frame time, the VHR of the RMM257/SD1 composite layer for the optimal mixture (i.e. the 4/6 mixture) is ~97%, which is a little bit lower than the industrial standard, i.e. ~99%. However, our prime target for the proposed RMM257/SD1 composite photo alignment layer is a field sequential color display based on ESHFLCs with a frame time ~5 ms. For this frame time the VHR of the 4/6 mixture frame time is ~99% as shown in FIG. 4 which is widely accepted [20].

In addition to all of these issues another most serious issue is image sticking in displays, which is related to the RDC of the alignment layer. This becomes even more serious for any particular frame is displayed for a long time. Therefore, for a good alignment layer, the RDC should be low. For the alignment layer made of mixture, as in our case, the RDC is of great concern as mixing generates many impurities and sometimes ions as well, resulting in an increase of RDC. To measure the RDC of the RMM257/SD1 composite alignment layer, first the 5 μm-thick nematic cell has been charged for 1 hour at 60° C. by the 10V DC signal, i.e. called as soak, and thereafter the cell was disconnected from the DC source and simultaneously shorted circuited for 1 sec to discharge the LC capacitor (discharging) and later on the residual voltage of cell has been measured for 10 min. The standard value of the RDC has been defined as the magnitude of the residual voltage after 10 minutes [21].

As expected, because of mixing, the RDC of the stabilized SD1 by the polymer network is an issue and has been found to be considerably larger than that of the pure SD1. The RDC decreases at the higher concentration of the monomer but from the previous results we have found that the 4/6 mixture provides the best electro-optical features. Therefore, for mixture 4/6 based alignment layer, the second exposure dose, i.e. the exposure dose for the stabilization of the alignment layer, has been increased to increase the network density of the polymer in the alignment layer and afterwards the RDC was measured again, after making the same nematic cell of 5 μm thickness. The RDC of the stabilized SD1 layer with an irradiation dose of the 5.4 J/cm$^2$ is ~0.01V, which is comparable to that of the conventional PI. Therefore, in the end, it is advised to increase the exposure doses of the second exposure, i.e. stabilization, up to acceptable limits. (In our case, it is 5.4 J/cm$^2$.) Furthermore, the stability parameter for the 4/6 mixture with an increased irradiation dose for the stabilization is α~24, which is better than the previous measurement.

C. THE PRESENT INVENTION

A first aspect of the present invention provides a polymer azo-dye composite photo-alignment layer for a LC deposited thereon.

Figure 5A:
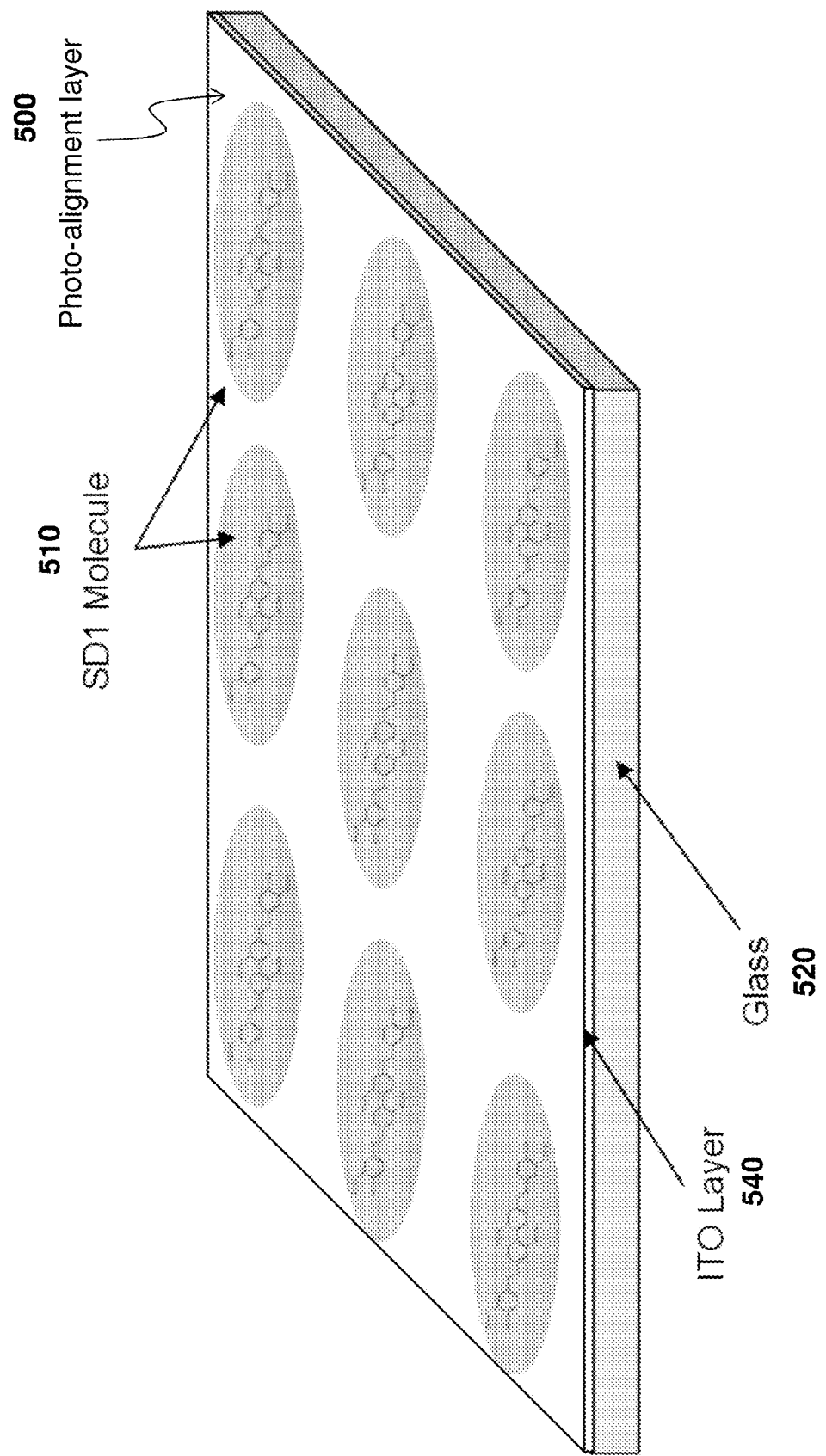
FIG. 5A depicts orientation of SD1 molecules and FIG. 5B depicts photosensitive polymers that form network within a SD1 layer.
Figure 5B:
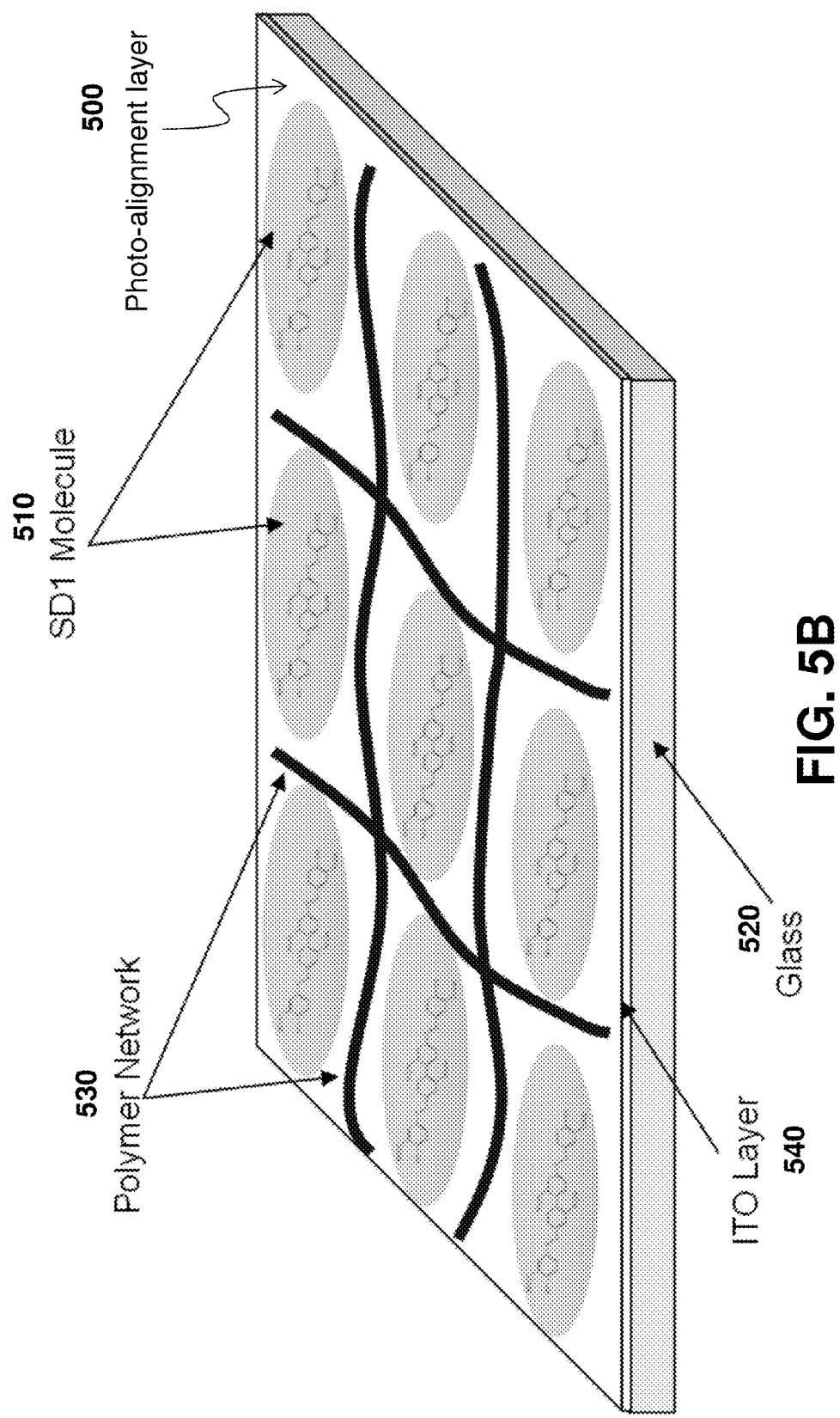

In an exemplary embodiment of the present invention, it is provided with a LC photo-alignment layer that is composed of polymer stabilized azo dyes, wherein the LC alignment and stabilization of the alignment layer has been realized in two different steps, and the alignment layer provides good and stable alignment to the liquid crystal. The photo curable polymer mixed with SD1 azo dyes is mixed in the optimal concentration (i.e. 0.67 wt/wt for which the contrast is maximum). Moreover, the absorption bands of the SD1 and of the photo-curable monomer are different (as shown in FIG. 1) so that the alignment and stabilization have been done at different time. FIGS. 5A and 5B show the LC photo-alignment layer according to the exemplary embodiment of the present invention. A photo-alignment layer 500 is realized on top of an ITO layer 540, which rests on a glass substrate 520. The photo-alignment layer 500 comprises SD1 molecules 510 arranged with an orientation as shown in FIG. 5A. In particular, the photo-alignment layer 500 is stabilized by forming a polymer network 530 that encloses the SD1 molecules 510.

In another embodiment of the present invention, the LC photo-alignment layer is further configured such that the anchoring energy has been tuned for the optimal value of the FLCs by using different irradiance and thereafter the stabilization of the alignment layer has been done by two instances of irradiance with light beams of different wavelength.

In yet another embodiment of the present invention, the LC photo-alignment layer is preferably configured such that at the optimal concentration (i.e. 0.67 wt/wt), the alignment layer manifests itself with a low RDC. The RDC value of the optimal polymer stabilized SD1 LC alignment layer is below 20 mV. In this embodiment, it is also claimed that the LC alignment layer composed of a stabilized SD1 layer provides the same electro-optical characteristics as per the pure SD1 layer and the VHR that has been measured ESHFLC display cell is more than 99% that is acceptable for the real applications.

Figure 6:
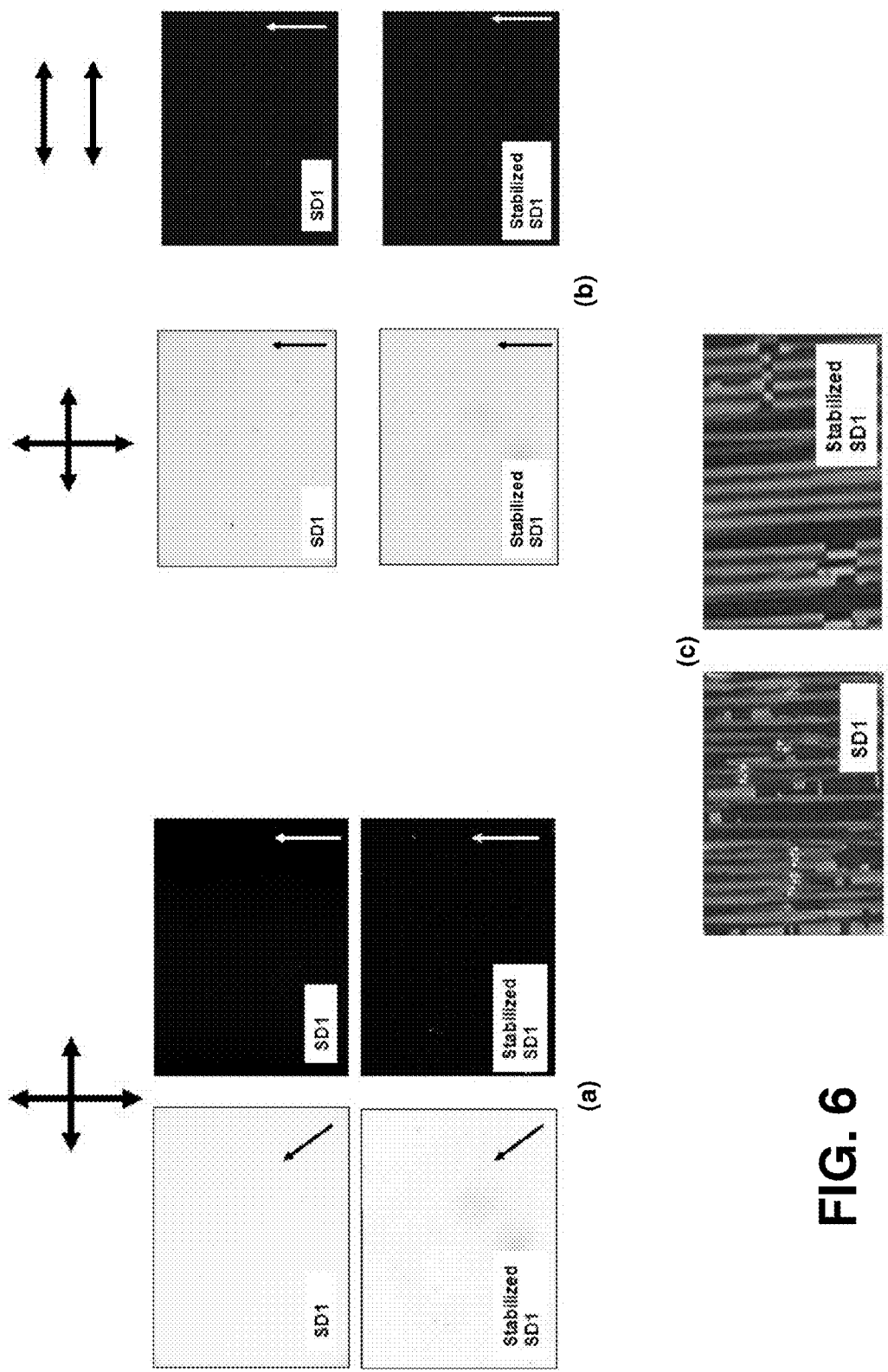
FIG. 6 shows results regarding alignment comparison with cells aligned with pure SD1 and stabilized SD1: (a) 1.5 µm thick FLC texture under a polarized microscope; (b) bright and dark states of anti-parallel NLC cells under a polarized microscope; (c) bright and dark states of twist nematic cells under a polarized microscope; where arrows show the direction of the polarizers and analyzers.

In a further embodiment of the present invention, the polymer stabilized SD1 LC alignment layer further provides good alignment to LCs. FIG. 6 shows results regarding alignment comparison with cells aligned with pure SD1 and stabilized SD1. It is shown that the alignment quality for LCs is comparable to the alignment quality of the pure SD1 photo-alignment layer or any other commercially available alignment layer. The planar and twisted alignment of the nematic cell for their dark and bright states has been compared in the insets of (a) and (b) of FIG. 6. Moreover, it is also claimed that the same alignment layer also provides good alignment to FLCs as shown in the inset (c) of FIG. 6. As a result, the FLC cell such developed with the stabilized alignment layer has bright and dark states compared to those made with the pure SD1 alignment layer, as demonstrated in FIG. 7.

Figure 8:
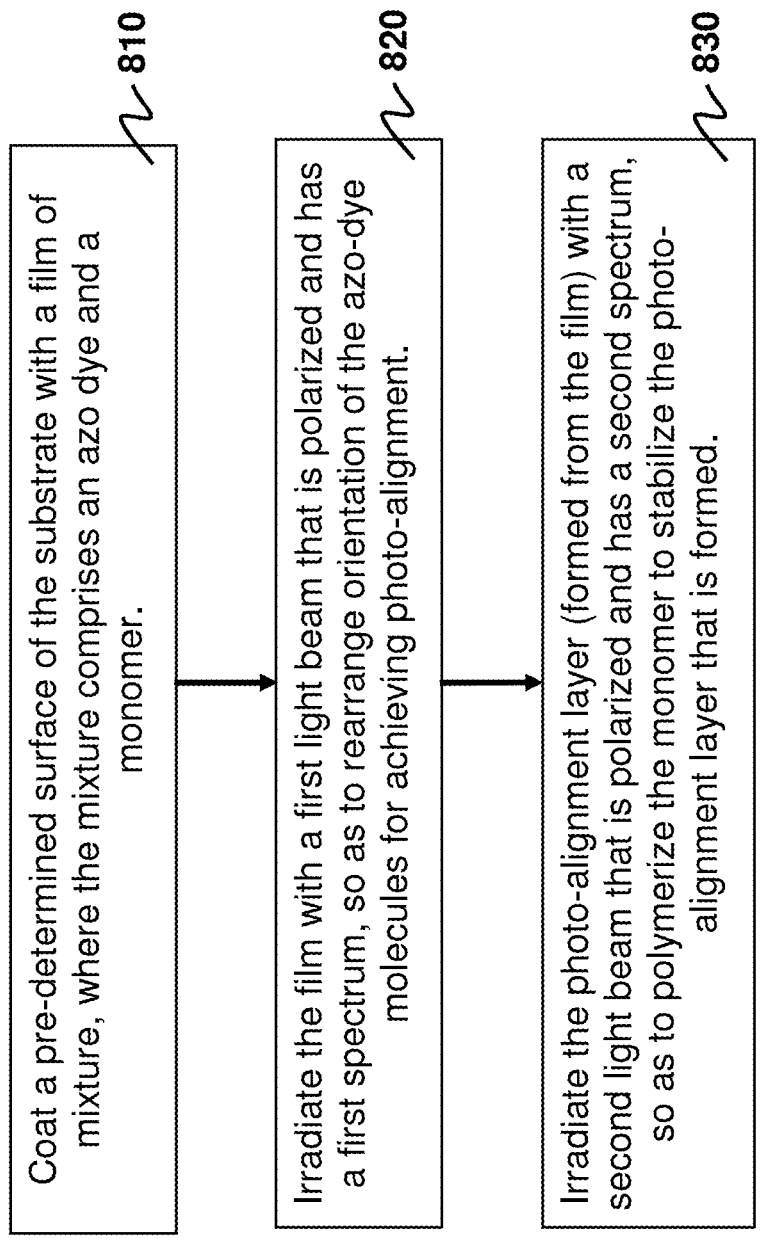
FIG. 8 is a flowchart for exemplarily illustrating the method disclosed herein in the present invention.

A second aspect of the present invention is to provide a method for forming a liquid-crystal photo-alignment layer on a substrate, where the photo-alignment layer is a polymer azo-dye composite photo-alignment layer. The substrate may be a piece of glass. The photo-alignment layer is usually positioned on the substrate with an ITO layer between the photo-alignment layer and the substrate. FIG. 8 is a flowchart showing the steps of the method according to an exemplary embodiment of the present invention.

Exemplarily, the method comprises coating a pre-determined surface of the substrate with a film of mixture, as is indicated in a step 810. The pre-determined surface is an area on which LCs are to be deposited on the substrate. For example, if a liquid crystal display (LCD) is to be manufactured, the pre-determined area defines the display screen of the LCD. The mixture comprises an azo dye and a monomer. The azo dye has a light-absorption peak at a first wavelength. Furthermore, the azo dye is configured such that orientation of molecules of the azo dye is rearranged according to a polarization orientation of polarized light irradiated on and absorbed by the film. The monomer has a light-absorption peak at a second wavelength and is polymerizable by absorbing light irradiated on the film. Advantageously, the first wavelength is spaced apart from the second wavelength such that photo-alignment of the azo-dye molecules and stabilization of the photo-alignment layer are achievable by two separate exposures of light to the film. For example, the first wavelength is 365 nm and the second wavelength is 300 nm, both figures being used in the experiment expounded in Section A. The azo dye and the monomer may be selected to be SD1 and RMM257, respectively.

In a practical, preferable implementation of the method, the film is irradiated with a first light beam that is polarized and has a first spectrum including the first wavelength and excluding the second wavelength, as is indicated in a step 820. Photo-alignment of the azo-dye molecules is then achieved, causing at least part of the film to form the photo-alignment layer on the substrate. Thereafter, the photo-alignment layer is irradiated with a second light beam that is polarized and has a second spectrum including the second wavelength, as is indicated in a step 830. It follows that the monomer is polymerized to form a polymer network that stabilizes the photo-alignment layer.

In one option, the first light beam is generated a two-step approach. First, a third light beam that is polarized and has a third spectrum containing the first spectrum and the second wavelength is generated. Thereafter, the third light beam is filtered with an optical filter to yield the first light beam, where the optical filter has a stop band including at least the second wavelength.

The azo dye and the monomer may be selected such that the azo dye has a first absorption band including the first wavelength and the monomer has a second absorption band including the second wavelength, where the second absorption band is substantially different from the first absorption band.

An irradiance dose of the first light beam may be set to a first pre-selected value for configuring a polar anchoring energy or an azimuthal anchoring energy of a LC to be deposited on the photo-alignment layer. In addition, an irradiance dose of the second light beam may be set to a second pre-selected value so as to substantially-fully polymerize the monomer, thereby completely forming a polymer network for stabilizing the photo-alignment layer.

In the mixture, preferably the monomer has the optimal concentration of 0.67 wt/wt of the azo dye.

In one choice of the monomer, the monomer is photo-curable so that molecules of the monomer are polymerized and cross-linked when irradiated by the second light beam.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for forming a liquid-crystal photo-alignment layer on a substrate, comprising:
   coating a pre-determined surface of the substrate with a film of mixture, the mixture comprising an azo dye and a monomer, the azo dye having a light-absorption peak at a first wavelength and being configured such that orientation of molecules of the azo dye is rearranged according to a polarization orientation of polarized light irradiated on and absorbed by the film, the monomer having a light-absorption peak at a second wavelength and being polymerizable by absorbing light irradiated on the film, wherein the first wavelength is spaced apart from the second wavelength;
   irradiating the film with a first light beam that is polarized with a first plane of polarization and has a first spectrum including the first wavelength and excluding the second wavelength, whereby photo-alignment of the azo-dye molecules is achieved, causing at least part of the film to form the photo-alignment layer on the substrate; and
   after the film is irradiated with the first light beam, irradiating the photo-alignment layer with a second light beam that is polarized with a second plane of polarization and has a second spectrum including the second wavelength, wherein the second plane of polarization is same as the first plane of polarization, whereby the monomer is polymerized to stabilize the photo-alignment layer that is formed.

2. The method of claim 1, wherein:
   the azo dye has a first absorption band including the first wavelength; and
   the monomer has a second absorption band including the second wavelength, the second absorption band being substantially different from the first absorption band.

3. The method of claim 1, wherein in the mixture, the monomer has a concentration of 0.67 wt/wt of the azo dye.

4. The method of claim 1, wherein the monomer is photo-curable so that molecules of the monomer are polymerized and cross-linked when irradiated by the second light beam.

5. The method of claim 1, further comprising:
   setting an irradiance dose of the first light beam to a pre-selected value for configuring a polar anchoring energy or an azimuthal anchoring energy of a liquid crystal to be deposited on the photo-alignment layer.

6. The method of claim 1, further comprising:
   setting an irradiance dose of the second light beam to a pre-selected value so as to substantially-fully polymerize the monomer.

7. The method of claim 1, further comprising:
   generating a third light beam that is polarized and has a third spectrum containing the first spectrum and the second wavelength; and
   filtering the third light beam with an optical filter to yield the first light beam, the optical filter having a stop band including at least the second wavelength.

8. The method of claim 1, further comprising:
   mixing the azo dye and the monomer in an optimal concentration and then dissolving in a solvent to form the mixture.

\* \* \* \* \*